United States Patent
Wright

(10) Patent No.: US 9,649,667 B2
(45) Date of Patent: May 16, 2017

(54) APPARATUS FOR SURFACE TREATMENT OF AN ELONGATE OBJECT

(71) Applicant: Muehlhan AG, Hamburg (DE)

(72) Inventor: John Phillip Wright, Martinez, CA (US)

(73) Assignee: Muehlhan AG, Hamburg (DE)

( * ) Notice: Subject to any disclaimer, the term of this patent is extended or adjusted under 35 U.S.C. 154(b) by 318 days.

(21) Appl. No.: 13/967,584

(22) Filed: Aug. 15, 2013

(65) Prior Publication Data

US 2015/0047140 A1 Feb. 19, 2015

(51) Int. Cl.

| | | |
|---|---|---|
| *B08B 1/00* | (2006.01) | |
| *B05C 1/04* | (2006.01) | |
| *B05C 11/04* | (2006.01) | |
| *D07B 7/02* | (2006.01) | |
| *D07B 7/12* | (2006.01) | |
| *D07B 7/14* | (2006.01) | |
| *E01D 22/00* | (2006.01) | |

(52) U.S. Cl.
CPC ............... *B08B 1/008* (2013.01); *B05C 1/04* (2013.01); *B05C 11/04* (2013.01); *B08B 1/006* (2013.01); *D07B 7/02* (2013.01); *D07B 7/12* (2013.01); *D07B 7/14* (2013.01); *D07B 2501/203* (2013.01); *E01D 22/00* (2013.01); *F16N 2210/34* (2013.01)

(58) Field of Classification Search
None
See application file for complete search history.

(56) References Cited

U.S. PATENT DOCUMENTS

| | | | |
|---|---|---|---|
| 1,943,818 A | 1/1934 | Fantone et al. | |
| 2,654,442 A | 10/1953 | Yakopatz | |
| 3,332,393 A | 7/1967 | Hoover | |
| 4,169,427 A | 10/1979 | Crump et al. | |

(Continued)

FOREIGN PATENT DOCUMENTS

| | | |
|---|---|---|
| CA | 1 079 912 A2 | 6/1980 |
| DE | 07903268 U1 | 3/1980 |

(Continued)

OTHER PUBLICATIONS

Written Opinion of the International Searching Authority provided for PCT/EP2014/002195.*

(Continued)

*Primary Examiner* — Charles Capozzi
(74) *Attorney, Agent, or Firm* — Howard IP Law Group, PC

(57) ABSTRACT

An apparatus (1) for surface treatment of an elongate object (50), such as a wire rope, while the apparatus (1) travels along the object (50), including a squeegee unit (10) for applying a deformable material, such as a coating material, comprising:
a first and a second opening (16, 17) which are mutually aligned and through which said elongated object (50) is able to pass in a longitudinal direction (12), wherein
a squeegee element (102) is provided between the first and the second opening (16, 17) defining an opening (15) which is adapted to the cross sectional shape of the elongated object (50) to distribute a coating layer by wiping along the surface of the elongated object (50) passing through said opening (15).

16 Claims, 6 Drawing Sheets

(56) References Cited

U.S. PATENT DOCUMENTS

| | | | |
|---|---|---|---|
| 4,336,866 A | | 6/1982 | Blanton, Jr. |
| 4,422,208 A | | 12/1983 | Rohrbaugh |
| 4,539,931 A | * | 9/1985 | Kikuta et al. .............. 118/404 |
| 4,845,683 A | * | 7/1989 | Sine .............................. 367/106 |
| 4,982,473 A | * | 1/1991 | Farris et al. .............. 15/256.6 |
| 5,321,356 A | | 6/1994 | Weischedel |
| 2002/0086158 A1 | | 7/2002 | Stubler et al. |
| 2008/0023123 A1 | | 1/2008 | Downton et al. |

FOREIGN PATENT DOCUMENTS

| | | |
|---|---|---|
| DE | 02856827 A1 | 10/1980 |
| EP | 0 343 340 A1 | 11/1989 |
| EP | 1 211 350 A1 | 6/2002 |
| GB | 0203821 A | 7/1980 |
| JP | 2011 080175 A | 4/2011 |
| WO | 87/07534 A1 | 12/1987 |

OTHER PUBLICATIONS

International Search Report provided for PCT/EP2014/002195, mailed on Dec. 6, 2015.*

Litterer PylonbrÜcke (German language document and English Machine Translation Attached).

Sanierung auf hochstem Niveau, KorroNews, Jan. 2005, p. 4 (German language document and English Machine Translation Attached).

International Search Report for International Application No. PCT/EP2014/002195, dated Jun. 12, 2015.

\* cited by examiner

APPARATUS FOR SURFACE TREATMENT OF AN ELONGATE OBJECT

FIELD OF THE INVENTION

The present invention generally relates to an apparatus for surface treatment of an elongate object, specifically a wire rope or a cable, while the apparatus travels along the object.

BACKGROUND OF THE INVENTION

For the treatment of elongate objects like free tensioned support cables, e.g., of diagonal cable or vertical cable bridges, cable trucks have been used. They are operated like a cable car, and are occupied by one or two workers who perform the surface treatment of the cable more or less manually. The cable to be treated is stationary while a second cable moves and serves the purpose of propulsion of the cable truck.

The treatment of such cables usually comprises cable cleaning including descaling and/or stripping off an old coating, cable painting includes the application of a coating material (paint), and, sometimes, prior to the painting, cable caulking. During cable caulking, which is performed prior to a final application of coating or painting layer, a coating or sealing material is forced down into the voids and cracks of a wire rope so that all gaps between the strands and wires are caulked shut.

Therefore, subsequent coating layers can be applied to a surface that is fairly smooth and uniform. Cable painting without prior cable caulking usually protects only most of the exterior but not those areas which are in gaps between the bundles. Such an incomplete coating may allow water intrusion extending inside of the cable.

For cleaning and painting mobile units are known which are propelled along a cable to be treated.

U.S. Pat. No. 4,169,427 A1 discloses a cable unit comprising a chamber adapted to surround a section of the cable to be cleaned, a plurality of outlets located within the chamber through which jets of high pressure fluid are directed onto the surface of the cable and a mechanism for withdrawing fluid from the chamber. A traction unit for moving the cleaning unit along the cable to be cleaned is also known.

GP 2038212 A1 discloses an apparatus for painting which comprises a container formed of two halves hinged together, which has two aligned orifices through which the cable passes, an outlet orifice with an exchangeable die to determine coating thickness and an inlet orifice which is contained in a spigot extending from the container and including ring seals to prevent the coating material which is inside the container from rinsing or dripping out of the container. The cable is painted (soaked) by puffing it through the painting fluid inside the container wherein the amount of paint applied to the outside is limited by the diameter of the exchangeable die in the outlet orifice.

Caulking off voids, crevices and recesses in a wire rope between individual strands, bundles or single wires require mechanical force which can not be exceeded by the known apparatuses and is usually performed manually. For this purpose the sealing or caulking material is worked into cable interstices and can be built up to form planar surfaces between adjoining cables strands of a complete cable bundle. The caulking material is packed so as to avoid any bubbles or voids that could lead water into the interior of the cable. Instead of planar surfaces and completely filled voids between adjoining cable bundles and strands, it is also possible to form grooves following the voids between such cable bundles and strands to save caulking material. The whole process is performed more or less by hand and is labor-intensive and expensive.

SUMMARY OF THE INVENTION

It would be desirable to provide an apparatus for surface treatment of an elongate object, specifically wire rope or cable, during travelling along the object which is suitable to automatically force a coating or caulking material down into the voids and shape of an elongated object, specifically wire rope, so that all gaps between the bundles and strands are caulked shut.

It would also be desirable to provide such an apparatus in combination with a cable painting device which is suitable to apply a suitable amount of coating or caulking material previous to the caulking process itself and to apply top coats after the caulking.

Embodiments of the present invention provide an apparatus for treating an elongate object, specifically a wire rope, during travelling along the object, including a squeegee unit for applying deformable material, specifically a coating material, comprising a squeegee unit housing having a first and second opening, which are mutually aligned and through which said elongated object is able to pass in a longitudinal direction, wherein at least one squeegee (wiper blade) is mounted between the first and the second opening defining a third opening, which is adapted to the cross-sectional shape of the elongated object, to distribute a coating layer by wiping along the surface of an elongated object passing through said opening.

Further, according to embodiments the present invention, there is provided a coating unit mounted in front of the squeegee unit in a travelling direction along the object to be coated for applying coating/caulking material to the elongated object.

BRIEF DESCRIPTION OF THE DRAWINGS

The various features of the invention will be better understood by reference to the following description of the embodiments shown in the accompanying drawings wherein.

DESCRIPTION OF EMBODIMENTS

Figure 1:
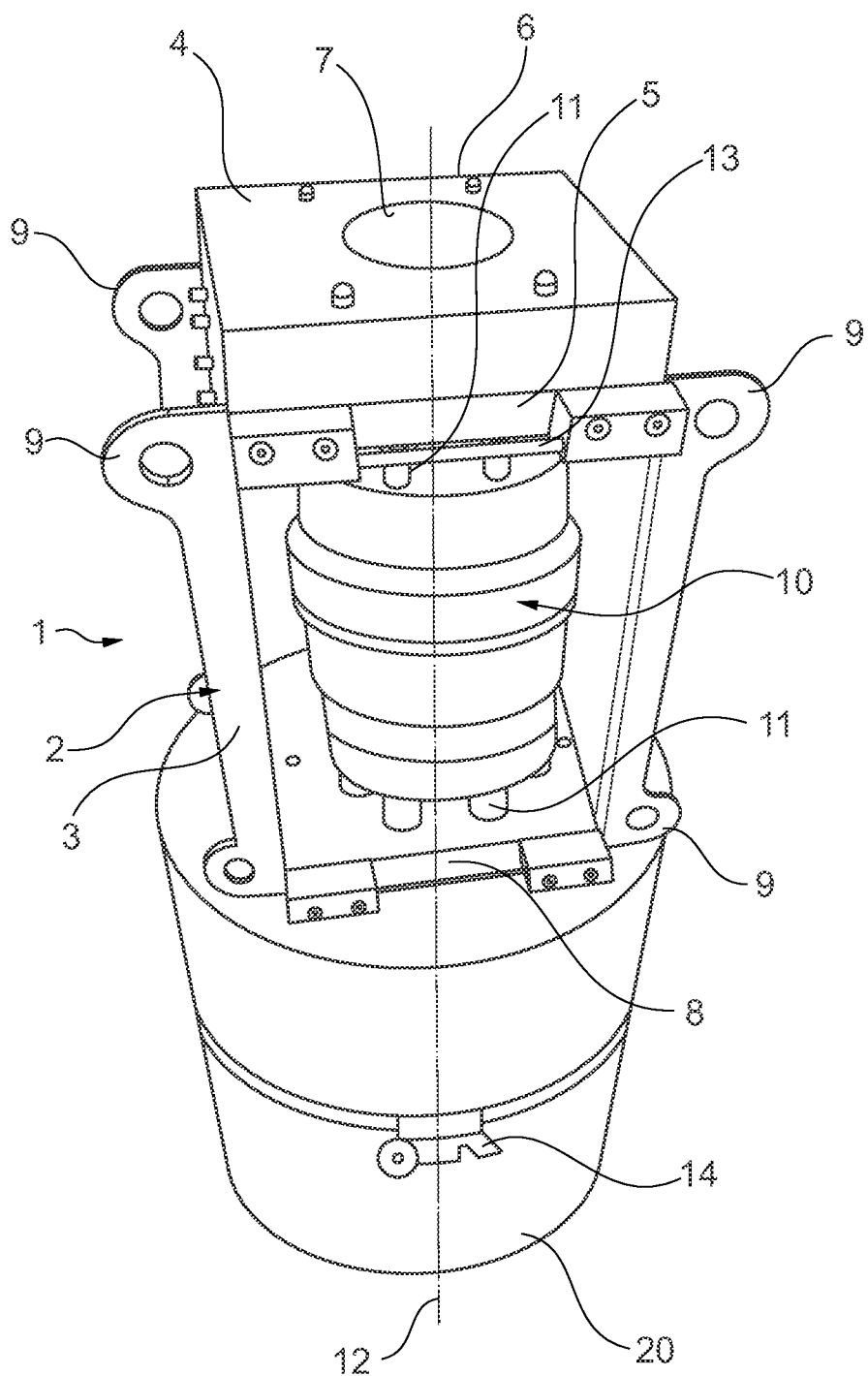
FIG. 1 shows a perspective view of one embodiment of the invention including a squeegee unit mounted within a frame carrying a guiding block mounted on top and a container for a coating unit.

FIG. 1 shows an embodiment of the present invention. Prior to a detailed description some general remarks with regard to embodiments are discussed in the following.

In an embodiment the squeegee element is constructed as a dismountable or removable wiper or doctor blade. This allows adapting the squeegee unit to different rope shapes (diameter, profile, twist) and coating material. Used and worn out squeegees can easily be replaced.

In an embodiment the squeegee unit comprises a plurality of squeegees spaced apart in the longitudinal direction (the travelling direction of the apparatus along the wire rope to be treated), wherein each squeegee defines an opening, each of the openings defined in the squeegee elements being mutually aligned along the longitudinal (travelling) direction. A plurality of squeegee elements improve the distribution of the coating material and helps to improve the caulking result, because the coating material is worked stepwise and repeatedly into the crevices or grooves in the exterior surface of the wire rope or other elongated object. The plurality of squeegee elements further supports the self centring ability of the squeegee unit.

In an embodiment a spacer element is arranged between adjacent squeegee s. Such a spacer element spaces apart the squeegees in a longitudinal direction and define annular chambers between adjacent squeegees which are suitable to absorb excessive amounts of coating which is wiped off the treated surface by the squeegee(s).

In a further embodiment a spacer element defines at least one of the first and second opening and is adapted to serve as a guiding sleeve on the object (wire rope) passing through the first and second openings. The use of the spacer element as guiding sleeves in the first and/or second opening further supports the self-centring feature of the squeegee unit on the treated wire rope and increases the performance of the squeegees. Specifically, the abrasive wear of the squeegees may be considerably reduced.

In an embodiment the spacer elements and squeegees are interconnected by tie-rods interspersing the spacer elements and the squeegee blades to form a solid stack. This arrangement allows for modular assembly of tailor-made squeegee units for each specific application (type of wire rope, type of coating, type of desired surface) and simplifies the replacement of squeegee and spacer elements.

Figure 4:
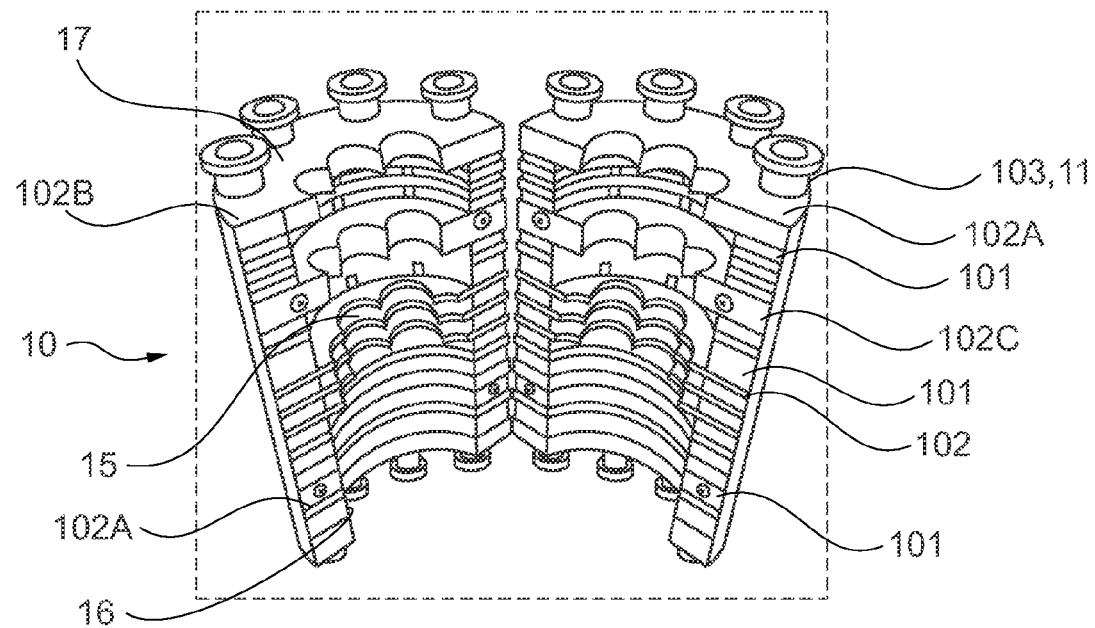
FIG. 4 shows a perspective view of the inside channel of the squeegee unit shown in FIGS. 2 and 3.

In an embodiment a cross-sectional shape of each squeegee opening corresponds to a multi-lobe cross-section of a multi-stranded rope. The squeegee may have the form of a ring with a circumferential inner edge, the inner edge having a generally circular shape with a scalloped pattern. The scalloped pattern may be defined by concave detents. The number of concave detents in each squeegee is determined depending on the number of lobes in the cross-section of the rope with which the squeegee is to be used. The number of detents in the scalloped pattern conforms to the number of helical protrusions of the wire rope, so that the shape of the squeegee conforms to the cross-section of the wire rope. In the embodiment of FIG. 4, each squeegee has six detents; however, this number is merely exemplary. With this squeegee shape excessive material can be wiped out off deep gaps or grooves defined between the cable bundles completely, but still ensures, a reliable closure of the narrow slits at the bottom of such gaps. In embodiments, the innermost portion of the squeegee, at the intersection of indents, may have a curvature of a desired radius to provide a thicker layer of caulk in the grooves of the rope, thereby allowing for a high quality surface of a subsequent painting layer.

Subsequent openings defined by the squeegees, spacer elements or any other multi-lobed openings are arranged with the respective scalloped patterns rotationally displaced relatively to each other to follow the lead of a twisted rope to be coated. Such a lead typically occurs in ropes with a right or left lay direction in which the outer layer of strand is laid helically around a centre strand or rope. The subsequent squeegees, having the same configuration of multi-detent openings, are arranged rotationally displaced to each other in such a way to follow this helical orientation. During operation the squeegee unit performs a helical rotating movement around and along the wire rope to be treated during the caulking process while travelling along the rope. An additional drive for the helical movement is not necessary.

In an embodiment the squeegees are formed from a flexible and or elastic sheet material, e.g. comprising one or combinations of: metal, rubber, GRP, HDPE. Elastomeric polyurethane, in any one of a number of available stiffness levels, may be employed.

In an embodiment the squeegee unit is adapted to be separable in an axial plane to be suitable for mounting to or dismounting from the elongate object to be treated at any place along the object.

In an embodiment the squeegee unit is mounted rotatable in a frame to perform a rotary (helical) motion around the elongated object while the frame is moved along the elongated object in a longitudinal direction. This embodiment simplifies the movement of the whole apparatus because the necessary helical rotation is only performed by the squeegee unit and the apparatus itself, specifically the frame or any other component, can easily be moved only in a longitudinal direction along the wire rope or other elongate object to be treated. This longitudinal movement can easily be obtained by a puffing rope arrangement in combination with a suitable winch unit. The movement can either be actively performed by the winch unit by hoisting the rope arrangement or passively by a controlled movement induced by the dead weight of the apparatus.

In an embodiment the apparatus further comprises a coating unit mounted in front of the squeegee unit in a travelling direction along the object to be coated for applying a layer of coating to the elongated object. This arrangement allows for the application of the specific (excessive) amount of painting or caulking material together with the caulking process itself which is performed immediately afterwards by the following squeegee unit. This reduces the set-up time of the whole apparatus considerably (painting and caulking is performed in one set-up) and improves the quality of the coating/caulking result because the process can be performed with fast drying/curing caulking/coating material which deliver a fast drying surface shortly after application of the material.

FIG. 1 shows an apparatus 1 for surface treatment of an elongate object specifically a wire rope or a cable comprising the following main components:

A box shaped frame 2 constructed by longitudinal and transversal frame members 3 supports on its upper end a self centering sleeve block 4 comprising two halves which are fixed to an upper support plate 5 by fixtures (bolts) 6 and define an outlet and guiding opening 7 and on its lower end a lower support plate 8.

Each frame corner carries a lug 9 which serves as a connection eye for attaching a hoisting rope to move the apparatus 1 along a rope to be coated. Between the upper 5 and lower support plate 8 a squeegee unit 10 is arranged which is positioned by the support plates 5, 8 in a longitudinal direction (along an axis 12), arranged movable in a transverse direction thereto and rotatable about the axis 12 by means of several rollers 11 forming a planar ball bearing at each end. At the lower end of the frame 2 an optional coating drum 20 is mounted which will be described in more detail below.

The whole apparatus 1 including the frame 2, the sleeve block 4, the support plates 5 and 8, the squeegee unit 10 and the optional coating drum 20 is divided in a plane of its longitudinal axis 12. Thereby the whole apparatus 1 is constituted by two halves which can either be completely separated or are connected by means of hinges (not shown). The halves are combined and fixed to each other by means of tension members 13 attached to frame 2 and/or by a tensioning latch 14 attached to the (optional) coating drum 20.

Figure 3:
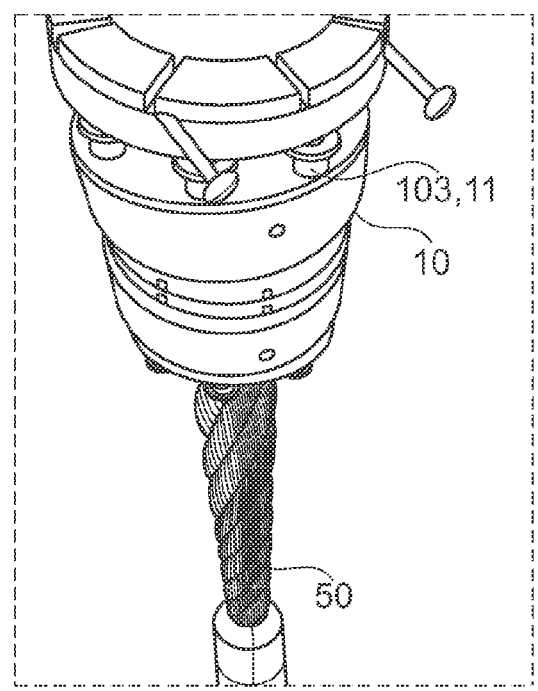
FIG. 3 shows a shows a perspective view of the squeegee unit in situ on a wire rope

During operation, an elongate object, specifically a wire rope or cable 50, is passed through the whole apparatus 1, namely through the frame 2, the inside of the sleeve like squeegee unit 10 and the sleeve block 4 along the longitudinal axis 12 (see FIG. 3). The whole apparatus 1 is hoisted along the wire rope 50 to be treated by means of one or more cables (not shown) attached to one or several of the lug(s) 9. The apparatus 1 is guided by the opening 7 inside the sleeve block 4 and by further (optional) guiding openings or guiding members attached to the coating drum 20 (not shown), by a similar opening (not shown) in the lower support plate 8 or in an additional sleeve block (not shown) which is attached to the lower support plate 8.

Figure 2:
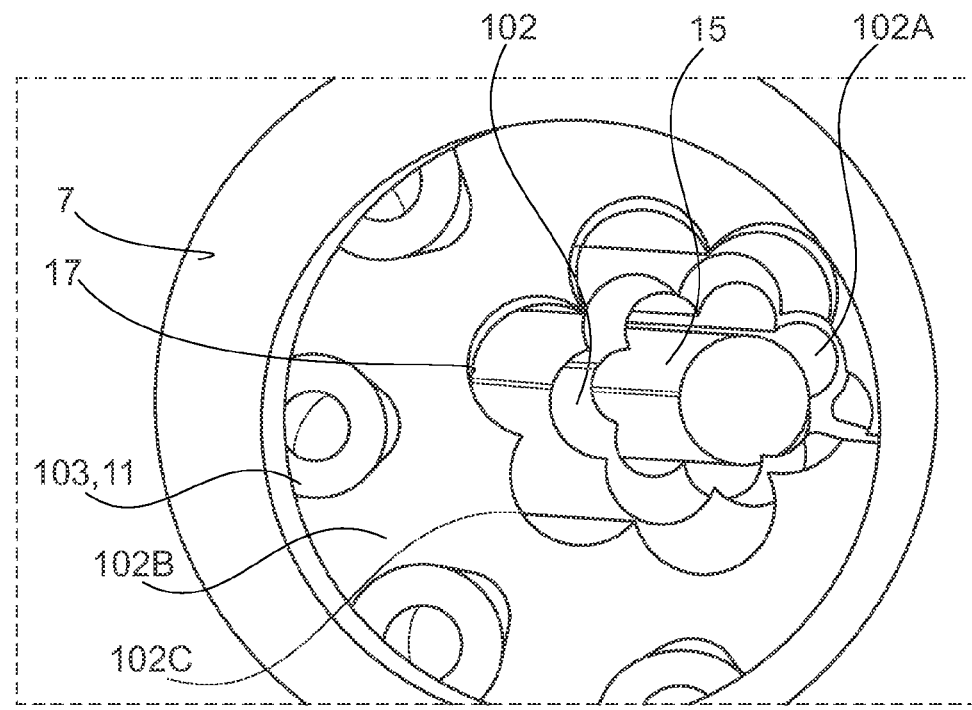
FIG. 2 shows a perspective view of the inside of two halves of the squeegee unit shown in FIG. 1 in an unused condition.

FIGS. 2, 3 and 4 show a structure of an embodiment of the squeegee unit 10. Each half of the squeegee unit 10 comprises a stack of semi-annular spacer elements 101 and semi-annular squeegee elements 102, wherein one or more spacer elements 101 are arranged between adjoining squeegee elements 102. The whole stack is interconnected by tie-rods 103 interspersing the spacer elements 101 and the squeegee elements 102 and carrying on its heads the rollers 11 of the planar bearings. The squeegee unit 10 in this embodiment is of modular construction. Space elements 101 and squeegee elements 102 may be removed, replaced and added.

Squeegee elements 102 and space elements 101, when assembled, define a squeegee unit housing. Squeegee unit housing has a generally cylindrical and continuous side wall, with no openings. The squeegees may constitute circumferential blades or wipers extending inward from an inner wall of the squeegee unit housing.

The inner circular diameters of the spacer rings including two semi-annular spacer elements 101 are larger than the outer diameter of the cable which is passed through the squeegee unit 10.

Each annular squeegee arrangement including two semi-annular squeegee elements 102 defines a generally circular opening 15 having a scalloped arrangement defined by a plurality of concave detents which corresponds to the shape of the wire rope 50. The diameter of each opening 15 may be slightly larger or slightly smaller than the diameter of the rope section. The diameters of the openings 15 of different subsequent squeegees 102 may differ and may decrease in diameter in the moving direction of the squeegee unit 10 along the rope 50. Such an arrangement improves the caulking result because the excessive coating material is not only wiped off the surface but also worked into the crevices between individual strands, braids and wires of the rope by a pressing force which is exerted by the inner edges of each squeegees 102 working on the rope.

The properties of the squeegees 102 can further be affected by the thickness, the material properties such as flexibility, elasticity, rigidity, wear resistance, structure (brush screens with radial bristles may also be an option, because they don't require a specific shape for different types and sizes of ropes and may reduce customizing efforts) etc. Suitable materials are: metal, rubber, GRP, HDPE. Squeegees 102 may in embodiments be solid, unitary and continuous materials. Alternatively, squeegees 102 may in embodiments be made up of discrete, discontinuous elements, such as being constituted by brushes having radial bristles of materials such as polyamides such as nylon or natural materials.

In FIGS. 2 and 4, a first squeegee blade 102A is shown which has a constant circle shaped opening 16 (see FIG. 4) which corresponds to the maximum diameter of a rope 50 passing through the squeegee unit 10 and serves as a first opening. It is mutually aligned with a second squeegee blade 102B which is arranged at the top of the squeegee unit 10. In the shown embodiment the second squeegee blade 102B has a multi-lobe, or scalloped, opening 17 which serves as second opening and performs the final coating/caulking procedure on the rope 50.

An additional stable guiding member or guiding sleeve 102C is arranged within the squeegee unit 10 between the first and second squeegee blade 102A, 102B and has a multi-lobe or scalloped cross-section which is guided along the profile of the rope 50 passing through the squeegee unit 10. The guiding member 102C centres the squeegee unit 10 on the rope and—in case of a twisted rope—transfers a rotational moment to the squeegee unit 10 during its movement along a twisted rope. Guiding member 102C may be a rigid body and may have a thickness greater than that of the first and second squeegee blades 102A,102C, such as five to twenty times the thickness of the first and second squeegee blades 102A, 102C. The greater thickness causes the guiding member 102C to be relatively rigid, thereby better transferring the rotational moment to the squeegee unit 10. The first and second squeegee blades 102A, 102C, may be from a thin sheet of flexible material. Each squeegee may be planar and lie in a plane transverse to a direction of motion of the elongated object.

The several squeegees 102 are mounted radially displaced to each other to follow the twist of a helically wounded rope 50. The view in FIG. 2 through the opening 15 inside the completely assembled squeegee unit 10 shows the helical arrangement of the squeegees 102 and the profiled guiding sleeve 102C.

In a different embodiment (not shown) the first and second openings 16, 17 can also be defined by spacer elements 101, either with a circular or a multi lobe inner opening.

FIG. 3 shows the squeegee unit 10 without the frame 2 in a working position on a rope sample 50.

Figure 6:
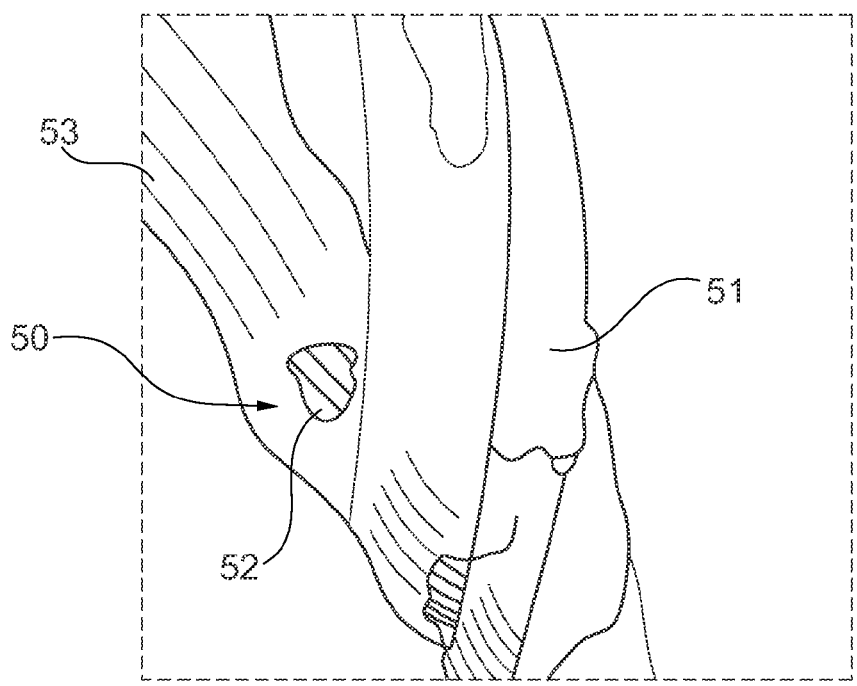
FIG. 6 shows a wire rope with applied (excessive) coating/caulking material prior to using the apparatus according to the present invention.

FIG. 6 shows a rope 50 which has been coated with coating/caulking material (manually performed for a test). In some areas 51 excessive coating material is applied and some areas 52 are not coated at all. Some areas 53 are already nicely coated and the individual strengths of the rope and the individual wires of the ropes can be seen through the coating.

Figure 7:
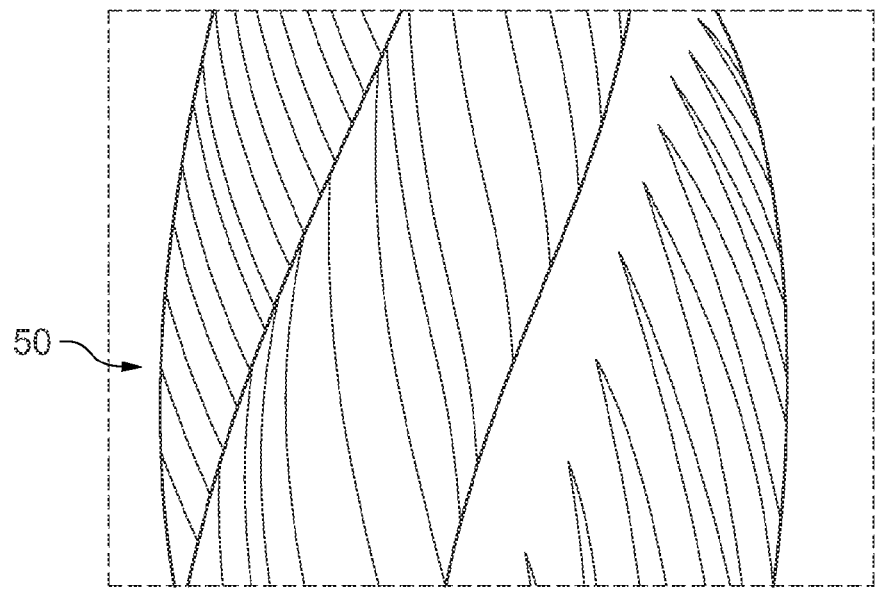
FIG. 7 shows a perspective view of the wire rope shown in FIG. 6 after the caulking process.

FIG. 7 shows rope 50 after the squeegee unit is moved along a rope section and has wiped off excessive coating material and worked into the gaps and crevices between individual strands and wires of the rope. After curing of this coating/sealing/corking material a substantially smooth surface is realized on rope which can be easily coated with additional layers of coating.

Figure 5:
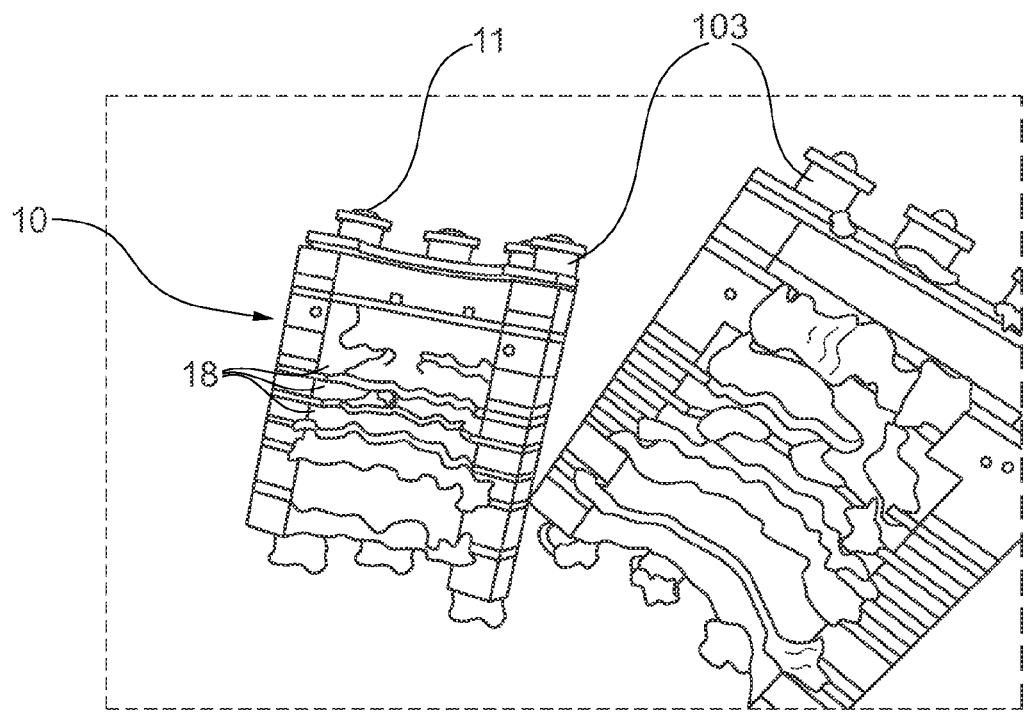
FIG. 5 shows a perspective view of the inside channel of the squeegee unit shown in FIG. 4 after distribution of caulking material on a wire rope.

FIG. 5 shows the inside of the squeegee unit 10 after operation and shows that the excessive coating material is collected in the annular chambers 18 defined between adjacent squeegees 102.

Figure 8:
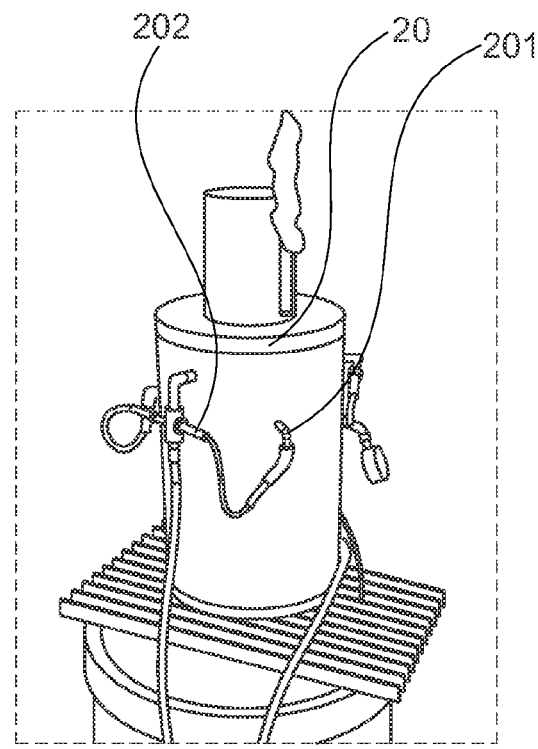
FIG. 8 shows a perspective view of a coating apparatus with connected paint supply lines.

FIG. 8 shows the coating drum 20 separately from the frame fully plumbed with spray nozzles 201 connected to coating supply lines 202 through which coating material is provided during operation.

Figure 9:
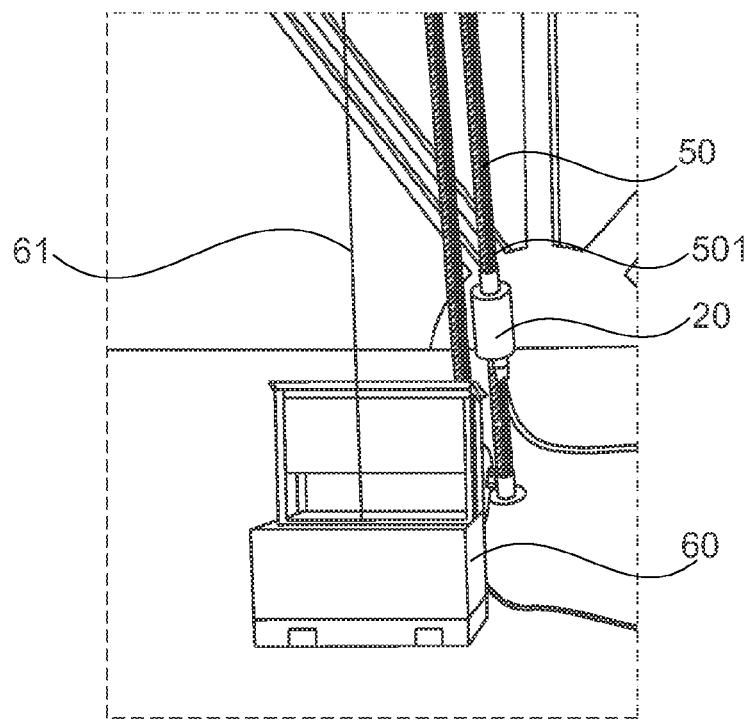
FIG. 9 shows a perspective view of the coating device shown in FIG. 8 in situ and coupled to a propulsion rope which is connected to a winch skid.

FIG. 9 shows a separate coating drum 20 in situ on a rope 50 with a hoisting rope 501 attached to a lug and connected to a winch system 60 with cable 61 which hoists the whole drum 20 up to the top end of the rope 50. During painting the drum 20 travels down the rope 50. The coat thickness is controlled by the travelling speed and the pressure/flow on the spraying nozzles 201 inside the coating drum 20.

Figure 10:
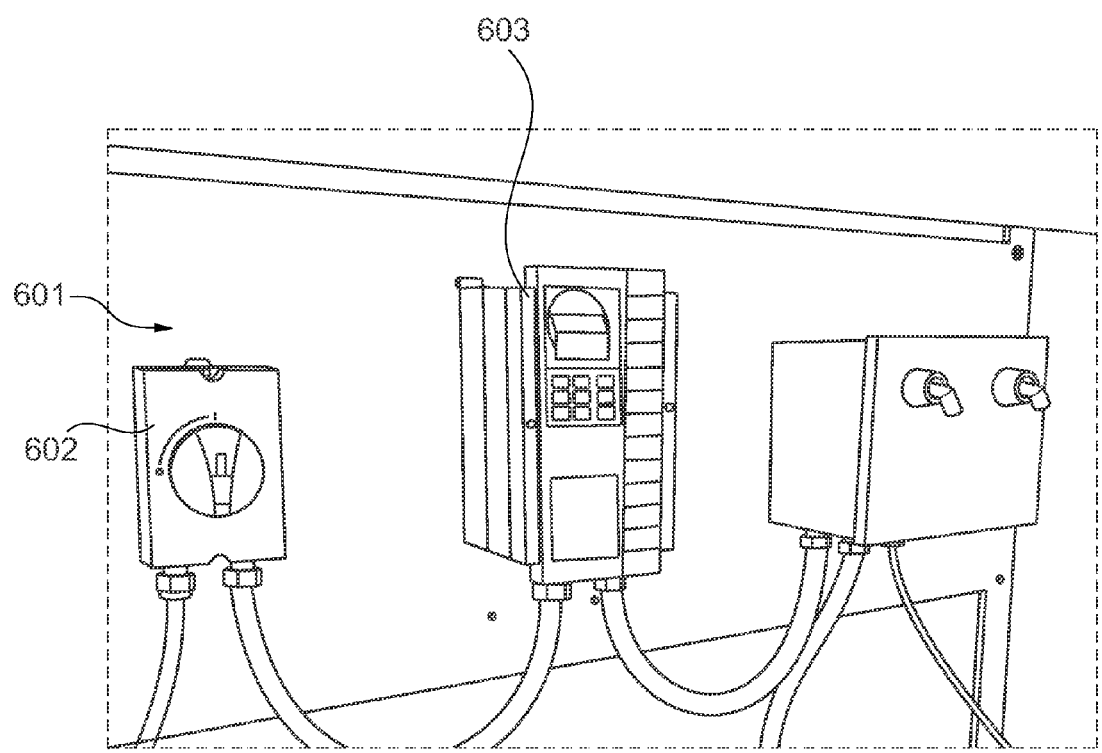
FIG. 10 shows a front view of the control panel for the winch skid shown in FIG. 9.

FIG. 10 shows the control panel 601 including a main switch 602 and the control 603 for entering specific values In an embodiment, a method of treating an elongated object, such as wire rope, having one or more helical protrusions, may include the following steps. An apparatus as described and shown herein, may be arranged around the elongated object. In an embodiment, the apparatus arranged around the elongated object includes a housing having open first and second ends, defining a chamber in communication with the first and second open ends aligned and spaced apart along a longitudinal axis and configured to receive the elongate object therethrough, and at least a first circumferential blade within the chamber, extending inward from the housing and having a scalloped pattern with a first number of concave detents, for receiving and wiping a surface of the elongate object. The scalloped pattern may be configured to receive the one or more helical protrusions of the elongated object. A coating material may be applied to the elongated object. The apparatus may be moved longitudinally relative to the elongated object, the blades of the apparatus wiping a portion of the coating material away from the elongated object and urging a portion of the coating material into the elongated object, such as into grooves defined between helical protrusions. A guiding sleeve as described herein may impart rotational motion to the apparatus as the apparatus moves relative to the elongated object.

The exemplary illustrations are provided by way of example only, and other embodiments for implementing the apparatus described herein may be contemplated by one of skill in the pertinent art without departing from the intended scope of this disclosure.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

The invention claimed is:

1. Apparatus for surface treatment of an elongated object comprising:
   a frame;
   a squeegee unit housing rotatably mounted within the frame having a first and a second opening, the first and second openings being aligned in a longitudinal direction and sized to permit said elongated object to pass through the openings;
   a first squeegee mounted in the squeegee unit housing between the first and the second opening, defining a squeegee opening having a shape conforming to a cross-sectional shape of the elongated object to distribute a coating layer by wiping along one or more helical protrusions of the elongated object passing through said squeegee opening;
   a circumferential rigid guiding member rigidly mounted on the squeegee unit housing, longitudinally and radially displaced with respect to the first squeegee, for imparting rotational motion to the squeegee unit housing responsive to longitudinal movement of an elongated object having helical protrusions,
   wherein the squeegee unit housing is configured to rotate about the elongated object while the frame is moved along the elongated object in a longitudinal direction of the elongated object.

2. Apparatus according to claim 1, wherein the first squeegee comprises a blade and is removably mounted in the squeegee unit housing.

3. Apparatus according to claim 1, further comprising a second squeegee mounted in the squeegee unit housing and spaced apart in the longitudinal direction from the first squeegee, wherein each of said first and second squeegees defines a squeegee opening mutually aligned along the longitudinal direction.

4. Apparatus according to claim 3, wherein a first spacer element is arranged between adjacent ones of the squeegees.

5. Apparatus according to claim 4, wherein a second spacer element defines at least one of the first and second opening and is adapted to serve as a guiding sleeve on the elongated object.

6. Apparatus according to claim 4, wherein said first spacer element and said first squeegee are interconnected by tie rods interspersing the spacer element and the first squeegee to form a solid stack defining the squeegee unit housing.

7. Apparatus according to claim 1, wherein a cross sectional shape of the squeegee opening corresponds to a multi lobe cross section of a twisted rope.

8. Apparatus according to claim 7, wherein subsequent squeegee openings have a multi lobe cross section and are arranged radially displaced to each other to follow the lead of a twisted rope to be treated.

9. Apparatus according to claim 1, wherein the squeegees are formed from a flexible sheet material comprising one of: metal, rubber, GRP, HDPE, and elastomeric polyurethane.

10. Apparatus according to claim 1, wherein the squeegee unit housing comprises a first part and a second part adapted to be separable in an axial plane.

11. Apparatus according to claim 1, further comprising a coating unit mounted in front of the squeegee unit housing in a travelling direction along the object to be treated for applying a coating material to the elongated object.

12. An apparatus for surface treatment of an elongated object, comprising:
- a housing having open first and second ends, defining a chamber in communication with the first and second open ends aligned and spaced apart along a longitudinal axis and configured to receive the elongated object therethrough;
- a first circumferential blade within the chamber, extending inward from the housing and having a scalloped pattern with a first number of concave detents, for receiving and wiping one or more helical protrusions of the elongated object; and
- a circumferential rigid guiding member within the chamber and rigidly mounted on the housing, having the scalloped pattern, longitudinally and radially displaced with respect to the first circumferential blade, for imparting rotational motion to the housing responsive to longitudinal movement of the elongated object having helical protrusions,
- wherein the housing is rotatably mounted in a frame to perform rotational motion around the elongated object which the frame is moved along the elongated object in a longitudinal direction.

13. Apparatus according to claim 12, further comprising a second circumferential blade within the chamber, having a scalloped pattern with the first number of concave detents, and longitudinally and radially displaced with respect to the first circumferential blade, wherein the circumferential rigid guiding member within the chamber is also longitudinally and radially displaced with respect to the second circumferential blade.

14. Apparatus according to claim 13, wherein the first and second circumferential blades are flexible.

15. Apparatus according to claim 13, wherein the first circumferential blade has a different diameter from a diameter of the second circumferential blade.

16. Apparatus according to claim 12, further comprising a spacer element having a scalloped pattern with the first number of concave detents at the first open end.

* * * * *